United States Patent [19]

Harned et al.

[11] 4,002,155
[45] Jan. 11, 1977

[54] ENGINE AND ENGINE SPARK TIMING CONTROL WITH KNOCK LIMITING ETC.

[75] Inventors: John L. Harned, Grosse Pointe Woods; Donald F. Herrick, Ann Arbor, both of Mich.

[73] Assignee: General Motors Corporation, Detroit, Mich.

[22] Filed: Jan. 12, 1976

[21] Appl. No.: 648,313

[52] U.S. Cl. .............................. 123/148 E; 73/35
[51] Int. Cl.$^2$ ........................................ F02P 11/02
[58] Field of Search ....... 123/148 E, 117 R, 119 R, 123/146.5 A; 73/35, 116

[56] References Cited

UNITED STATES PATENTS

| | | | |
|---|---|---|---|
| 2,450,882 | 10/1948 | Costa ................................. | 123/119 |
| 2,470,709 | 5/1949 | MacMillan ........................ | 123/117 |
| 3,393,557 | 7/1968 | Brown et al. ........................ | 73/116 |
| 3,487,640 | 1/1970 | Wostl et al. ........................... | 73/35 |
| 3,752,139 | 8/1973 | Asplund ..................... | 123/146.5 A |
| 3,822,583 | 7/1974 | Keller et al. ........................... | 73/35 |
| 3,903,857 | 9/1975 | Honig et al. ................... | 123/117 R |
| 3,919,987 | 11/1975 | Haubner et al. ............... | 123/117 R |

Primary Examiner—Edgar W. Geoghegan
Attorney, Agent, or Firm—Robert M. Sigler

[57] ABSTRACT

In a spark ignition internal combustion engine, an accelerometer is mounted on an engine component, preferably the intake manifold, and senses vibration including individual ringing vibrations due to engine knock or detonation. A reference signal is derived from the accelerometer signal during the portion of the engine cycle prior to possible knock-induced vibrations, which signal indicates the background accelerations due to noise. The number of individual ringing vibrations exceeding the reference signal during a predetermined amount of engine crankshaft rotation is counted. When the number of such counts exceeds a predetermined number during the predetermined crankshaft rotation, engine spark timing is retarded. If the number of such counts is less than a predetermined number during the predetermined crankshaft rotation, engine spark is advanced.

11 Claims, 9 Drawing Figures

ENGINE AND ENGINE SPARK TIMING CONTROL WITH KNOCK LIMITING ETC.

Spark ignition engines in automobile usage conventionally use a basic spark time setting which is advanced with manifold vacuum and engine speed in accordance with a spark timing schedule. The basic setting, the speed (or centrifugal) advance, and the amount of vacuum advance, are selected to provide spark timing sufficiently retarded from the timing that creates objectionable engine knock or detonation to prevent such knock. In establishing the basic setting and the advance characteristics, account is taken of the variations of knocking quality of the fuels likely to be used, the various engine operating conditions likely to be encountered, likely engine deterioration, and other factors that may require greater ignition retard to avoid engine knock or detonation. It has not been practically possible in automobile usage to provide the more efficient and responsive engine operation and other advantages that could be obtained if engine knock at undesirable levels was precluded.

The present invention is directd to a spark timing method and mechanism that can be applied to spark ignition automobile engines to preclude operation at an undesirable level of knock. In accordance with the preferred embodiment of the invention, the engine spark timing is programmed in any conventional manner to produce optimal engine performance as measured by factors other than engine knock levels, such as fuel consumption, emissions, etc. This timing may result in objectionable knock levels under some extreme engine operating conditions, including low octane fuel, high engine temperature, low speed acceleration, etc. The individual ringing vibrations of the engine structure (preferably sensed at the intake manifold) associated with knocking or detonation, if present, are sensed by an accelerometer having a frequency response sufficient to follow the individual vibrations or excursions. Over a counting period comprising a predetermined number of combustion events, a count is made of the times such individual vibrations exceed a predetermined reference level. A combustion event, as used herein, means the crankshaft position interval between successive spark plug firings, which, for an eight cylinder engine, would be approximately one quarter crankshaft rotation. If the count during the counting period exceeds a predetermined reference number, the spark timing for the engine is retarded a predetermined small number of crankshaft degrees in time to be effective on a subsequent count period, preferably the next. If the count is less than a predetermined reference number, the spark timing is advanced by a predetermined small number of crankshaft degrees in time to be effective on a subsequent count period, again preferably the next. Instead of a single count period, reference level and reference number, the invention might, and, in fact, in the most preferred embodiment does, simultaneously count to a small reference number with a high reference level during a short count rotation and to a large reference number with a low reference level over a long count rotation, retarding the spark when either reference number is exceeded and advancing the spark when neither reference number is exceeded.

In one form of the present invention, the foregoing mechanism responsive to the ringing vibrations may, by introducing a number of timed counts before spark generation occurs, retard spark timing from that generated by the programmed spark timing mechanism (including whatever speed, vacuum, or other spark advance that is provided). When the spark timing provided by the programmed spark timing mechanism does not produce ringing vibrations indicating undesirable knocking or detonation events, as measured by the predetermined numbers of ringing vibrations in the respective counting periods, the programmed spark timing mechanism (including whatever speed, vacuum or other advance is provided) controls the spark timing. At this time, the mechanism responsive to the ringing vibrations does not introduce any additional spark timing retard. On the other hand, if the number of ringing vibrations sensed at any time exceeds the reference numbers in the respective counting periods, the mechanism responsive to the ringing oscillations takes control by introducing additional spark timing retard as necessary to reduce such knock to an unobjectionable level.

In an alternative form of the present invention, the spark timing mechanism generates a number indicating a specific number of degrees of spark timing delay in relation to a crankshaft position reference. Such reference may, for example, be a fixed number of degrees before top dead center. The number of such spark timing delay (in relation to the reference) may, for example, be generated from that particular speed, manifold vacuum, and other engine operating conditions through the use of a memory, an algorithm, or both. The above apparatus responsive to the ringing vibrations of the engine structure associated with knocking or detonation events generates a second number indicating a specific number of additional degrees of spark timing retard. Apparatus is provided to combine the second number and the first arithmetically and thus provide, if the second number is not zero, a greater spark timing retard as required to reduce knock to an unobjectionable level.

It is therefore a general object of the present invention to provide an improved spark timing method and apparatus suitable for use with a spark ignition engine in automobile service wherein the spark timing is dynamically maintained at a value giving rise to an acceptable average number of knocking events and providing, at least under certain operating conditions, the most advanced spark timing attainable without objectionable knock under those particular conditions of operation.

More particularly it is an object of the present invention to provide an improved spark timing method and apparatus that operates a spark ignition engine in automobile service dynamically with spark timing at the most advanced value permitted by engine knock or detonation, at least under certain operating conditions, and wherein the tendency of one engine cylinder to knock before other cylinders knock is advantageously used for control purposes.

Another object of the present invention is to provide an improved combination of engine and spark timing control, wherein the engine mechanical characteristics are usefully applied to achieve spark timing, under at least some engine operating conditions, at the most advanced value permitted by engine detonation and knock, the combination being particularly suitable for automobile use.

It is a further object of this invention to provide a method of and means for operating a spark ignition automobile engine wherein spark timing is programmed to optimize selected engine operating parameters other than knock intensity but, when an objectionable knock intensity is sensed, the spark timing is retarded from the programmed timing by a closed cycle spark timing control to reduce knock intensity to an acceptable level.

Yet another object of the present invention is to provide an improved spark timing control system for a spark ignition automobile engine wherein digital counting pulses based on engine crankshaft rotation serve to effect computing operations in a manner that advantageously takes into account engine speed so as to provide, in effect, clocking determined by crankshaft rotational position rather than independent time.

Still another object of the present invention is to provide an improved spark timing method and apparatus wherein advantage is taken of the ringing vibrations that follow knocking or detonation events to provide a number of digital counts indicative of the degree of knocking and the extent the instantaneous engine operation is at the knock limited maximum spark advance, and wherein, at least under some engine operating conditions, spark advance or retard corrections take place rapidly and effectively so as to maintain engine operations at the knock limiting value.

Yet another object of the present invention is to provide a method of and means for timing the spark of a spark ignition internal combustion automobile engine which uses simple and effective analogue and digital apparatus to develop an essentially digital signal representative of the extent the engine is approaching an objectionable knocking or detonation condition that can be digitally processed to provide spark timing control.

Still another object of the present invention is to provide an improved engine spark timing method and apparatus in which a time varying signal varying in accordance with vibrations of an engine component, including ringing vibrations due to knock, is compared to a relatively slowly varying reference signal derived from the RMS or average value of said time-varying signal by periodically sampling said time-varying signal during times when no ringing vibrations due to knock are present.

Yet another object of the present invention is to provide an improved engine spark timing method and apparatus in which a signal varying in accordance with vibrations of an engine component including ringing vibrations due to knock is compared to an engine speed varying reference signal which approximates a borderline knock intensity that is not only below the level that causes engine damage but is also below the normally low level of substantial audibility to an occupant of a vehicle equipped with said engine, wherein said reference signal is derived from said vibration signal by periodically sampling the vibration signal, amplifying the RMS or average value of the sample and adding a constant bias.

The present invention further resides in features of construction, combination, and arrangement by which an improved spark timing method and apparatus is provided for automobile spark ignition engines in automobile usage that is simple in construction, reliable in operation, low in cost, highly effective in achieving the most advantageous spark timing without undue knocking, operates under varying engine speed, load and other conditions, and in other respects accommodates itself to practical large scale automobile usage.

The novel features believed to be characteristic of the present invention are set forth with particularity in the appended claims. The invention itself, both as to the steps of the process and the structure of the apparatus, together with further objects and advantages thereof, will be evident from the following description taken in connection with the accompanying drawings, in which:

Figure 5:
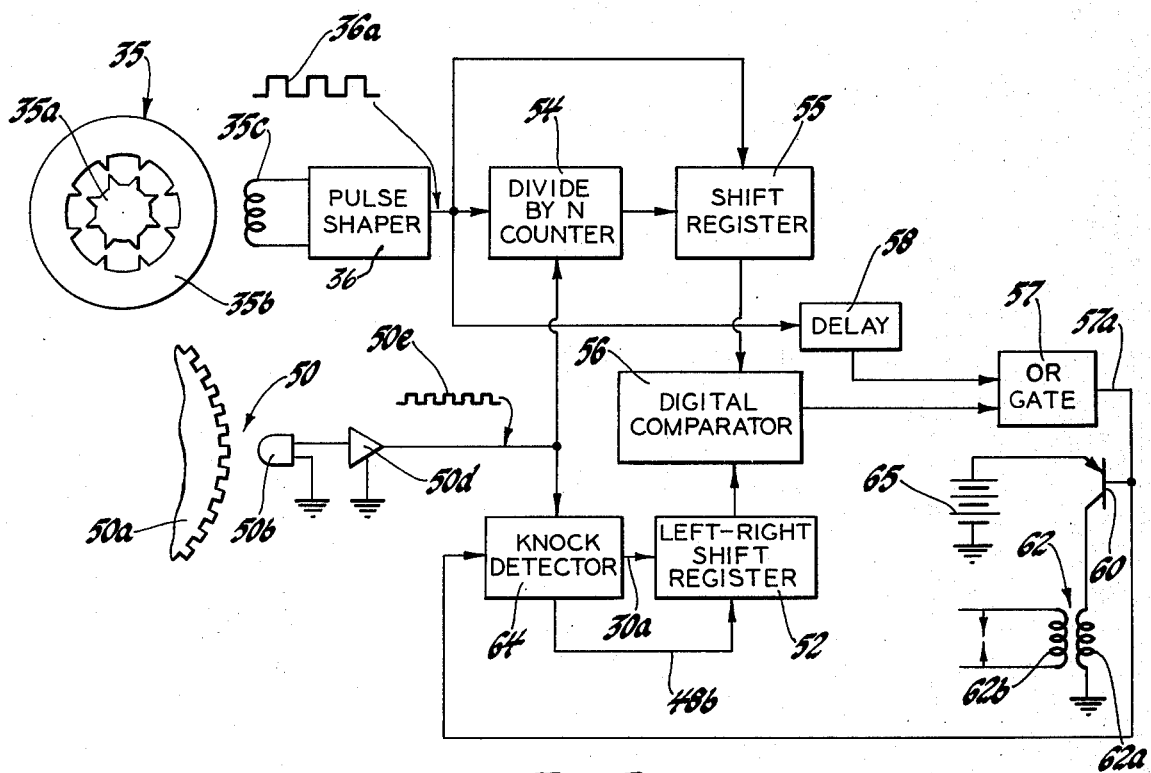
FIG. 5 is a diagram, partially in block form, showing the engine spark timing system responsive to the knock signal as generated by the apparatus of FIG. 3 to control engine spark timing.

A preferred embodiment of a system according to this invention using an engine knock detector to modulate spark timing so as to limit the spark advance to borderline knock levels is shown diagrammatically in FIG. 5. A standard engine ignition system includes, for example, a pulse generator 35 comprising a rotor 35a, a stator 35b and a pick-up winding 35c. This particular generator is of the variable reluctance type disclosed and described in U.S. Pat. No. 3,254,247, Falge, which issued May 31, 1966 and is assigned to the same assignee as that of the present invention. Rotor 35a and stator 35b each have a plurality of projections equally spaced around the circumference; and relative rotation between the two members at a speed proportional to engine speed produces a pulsating variation in reluctance which induces alternating voltage pulses in pick-up winding 35c.

Pulse shaper 36 represents typical electronic circuitry responsive to the alternating voltage pulses in pick-up winding 35c to produce a responsive train of dwell pulses 36a which, in the prior art, are normally applied directly to an output transistor 60 and thence to a standard ignition coil 62. The abrupt shutoff of current through ignition coil primary winding 62a by transistor 60 at the upward-moving trailing edge of each dwell pulse from pulse shaper 36 causes a high voltage to be induced in secondary winding 62b, which is supplied or distributed to the spark plug of the proper engine cylinder by a distributor (not shown) in the normal manner. Exemplary circuitry for use as pulse shaper 36 is shown in U.S. Pat. No 3,605,713 LeMasters et al, issued Sept. 20, 1971 and assigned to the assignee of the present invention.

The engine spark generating system described above may include standard spark timing means including normal vacuum and centrifugal advance means not shown but well known in the art of engine spark timing. It is contemplated that the standard portion of the spark generating system thus described will have its spark timing parameters set so as to optimize one or more engine variables such as power, efficiency or low emissions. The particular choice of parameters is not part of this invention except to the extent that the present invention permits choice of the parameters at values that allow spark timing at some extreme engine operating conditions which, if uncorrected, will produce an unacceptably high level of knock or detonation.

In order to limit knock intensity to an acceptable knock limited value during those periods when the spark timing produced by the standard ignition apparatus would otherwise result in a knock intensity greater than the acceptable level, additional apparatus is disclosed which senses a knock intensity greater than the knock limited level and includes digital circuit elements effective to delay the trailing edge of the dwell pulse produced by distributor 35 and pulse shaper 36 before that pulse is applied to transistor 60 in order to retard the spark timing sufficiently to maintain knock intensity at or below the knock limit level.

The output pulse train 36a from pulse shaper 36 is shown in FIG. 5. Pulses 36a will be referred to as the standard or unretarded dwell pulses since the timing of their trailing edges is the result of the standard ignition timing means.

Another train of pulses 50e, also shown in FIG. 5, is generated by a pulse generator generally indicated as 50. In an illustrative form, this pulse generator includes a toothed disk 50a which rotates with the engine crankshaft. This disk may, for example, be the engine flywheel, vibration damper, or other disk provided for another purpose on the engine. The teeth correspond in number to the spark timing resolution desired, such as, for example, one tooth per crankshaft degree. A magnetic pickup 50b, such as, e.g., Electro Corp. model 5B388, includes a winding that encircles a magnetic flux flow path that at least in part passes through the teeth so that a succession of positive and negative voltage pulses is generated in the winding, one positive pulse occurring for each degree of crankshaft rotation. Amplifier 50d includes a half wave rectifier and amplifying circuitry to produce at its output a succession of well defined pulses 50e repeating at one degree rotation (for example) of the crankshaft.

The output of pulse shaper 36, which, in a four stroke cycle eight cylinder engine, comprises a pulse for approximately each 90° of engine rotation, is applied as a train of reset pulses simultaneously to a divide by N counter 54 and a shift register 55. The output of amplifier 50d, which comprises a train of pulses 50e of repetitive rate of one per degree of engine rotation, is also applied to divide by N counter 54. Divide by N counter 54, when reset by the trailing edge of a pulse 36a, begins counting the pulses 50e and outputs a pulse to shift register 55 for every N pulses counted. The number N can be preset in counter 54 and provides a resolution control for the spark timing of a particular engine. In this example, N is chosen to equal four so that shift register 55 will receive an input pulse from counter 54 every fourth degree of engine rotation.

Shift register 55, fundamentally a counter, is reset to zero with the trailing edge of each pulse 36a. Upon each such reset it begins counting output pulses of counter 54 and produces that count as an output in parallel digital form to one input of digital comparator 56. Thus one input to digital comparator 56 is a count which begins at zero at the trailing edge of each pulse 36a and counts upward one digit for every fourth degree, in this example, of engine crankshaft rotation thereafter.

A knock detector 64, to be described in detail at a later point in this specification, receives pulses 50e from amplifier 50d as well as pulses 57a supplied to transistor 60, the trailing edge of which occur at the moments of actual spark ignition. Knock detector 64 counts individual ringing knock-induced vibrations for an interval between a specified number of ignition pulses 57a. At the end of this interval, an output 30a of knock detector 64 is in a high or "on" condition if knock intensity (as measured by the number of ringing vibrations exceeding the reference level or levels) greater than a threshold level has been detected and is in a low or "off" condition if knock intensity less than the threshold level has been detected. Shortly after the end of the time interval, a read pulse is produced by knock detector 64 at 48b and applied to a left-right shift register 52, which is fundamentally an up-down counter. Upon receipt of read pulse 48b, left-right shift register 52 reads the output 30a of knock detector 64 and counts upward one digit if output 30a is high and downward one digit, unless already zero, if output 30a is low. Left-right shift register 52 is capable of counting as low as zero, where it begins when the system begins operation, and as high as some preset limit such as, for example, four. The count of left-right shift register 52 is applied to another input of digital comparator 56.

Digital comparator 56 continually compares the count supplied by left-right shift register 52 with the count supplied by shift register 55 and generates a low output when the count on shift register 55 is less than the count of left-right shift register 52 and a high output when the count of shift register 55 is equal to or greater than the count of left-right shift register 52. The output of digital comparator 56 is applied to one input of an OR gate 57, the other input of which is supplied with the pulses from pulse shaper 36 through a delay element 58, which can be any delay device effective to provide a delay of approximately 1 to 2 microseconds.

The output of OR gate 57 is applied to the base of transistor 60. Transistor 60 being a PNP transistor in this embodiment, the emitter is connected to the positive potential side of a voltage source 65, the negative potential side of which is grounded. Voltage source 65 is, in most cases, the standard vehicle battery or alternator. The collector of transistor 60 is connected through the ignition coil primary winding 62a to ground.

In operation, the leading or downward-going edge of each pulse 36a causes OR gate 57 to switch off, with a slight delay due to delay device 58, and switch transistor 60 on to supply current through ignition coil primary winding 62a. At the trailing or upward-going edge of pulse 36a, shift register 55 is reset to zero, which produces a zero output therefrom to digital comparator 56. If the input from left-right shift register 52 is also zero at this time, digital comparator 56 produces a high output which, when combined with the slightly delayed high level of pulse 36a in OR gate 57, abruptly shuts off current through transistor 60. This, in turn, generates a spark voltage in ignition coil secondary winding 62b.

If, at the time shift register 55 is reset to zero, left-right shift register 52 contains a count greater than zero, digital comparator 56 switches to a low output before the upward going edge of pulse 36a, which is delayed by delay element 58, can be applied to OR gate 57. Thus, transistor 60 remains in conduction as shift register 55 begins counting upward from zero by one count for every 4° of engine rotation until the count equals that from left-right shift register 52. When the count of shift registers 52 and 55 become equal, the output of digital comparator 56 switches to a high level and OR gate 57 shuts off the current through transistor 60 to generate a spark voltage in ignition coil secondary winding 62b. In this case, the spark event has been delayed or retarded by a number of degrees of engine rotation equal to four times the count of left-right shift register 52. It can be seen that, in this example, the spark events may be retarded from the normal spark timing (as indicated by pulses 36a) by zero degrees, four degrees, eight degrees, twelve degrees or sixteen degrees. Different choices for the number N in divide by N counter 54 or the upper count limit of left-right shift register 52 would produce different sets of possible timing retard intervals. The choice is left to a designer working with a particular engine and ignition system.

KNOCK DETECTOR

Figure 3:
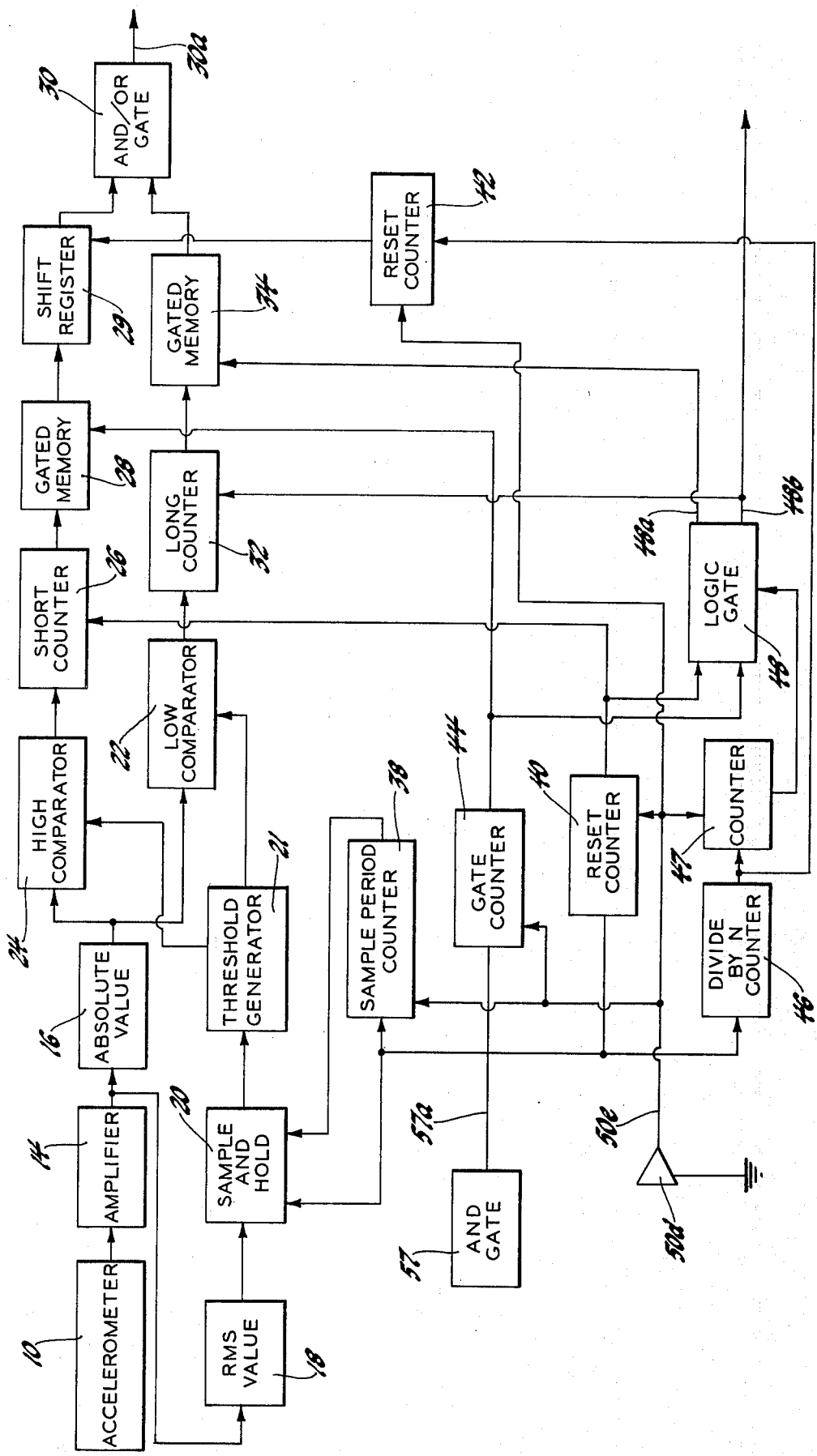
FIG. 3 is a block diagram showing an exemplary knock signal generating system for an engine spark timing system constructed in accordance with the present invention.
Figure 6:
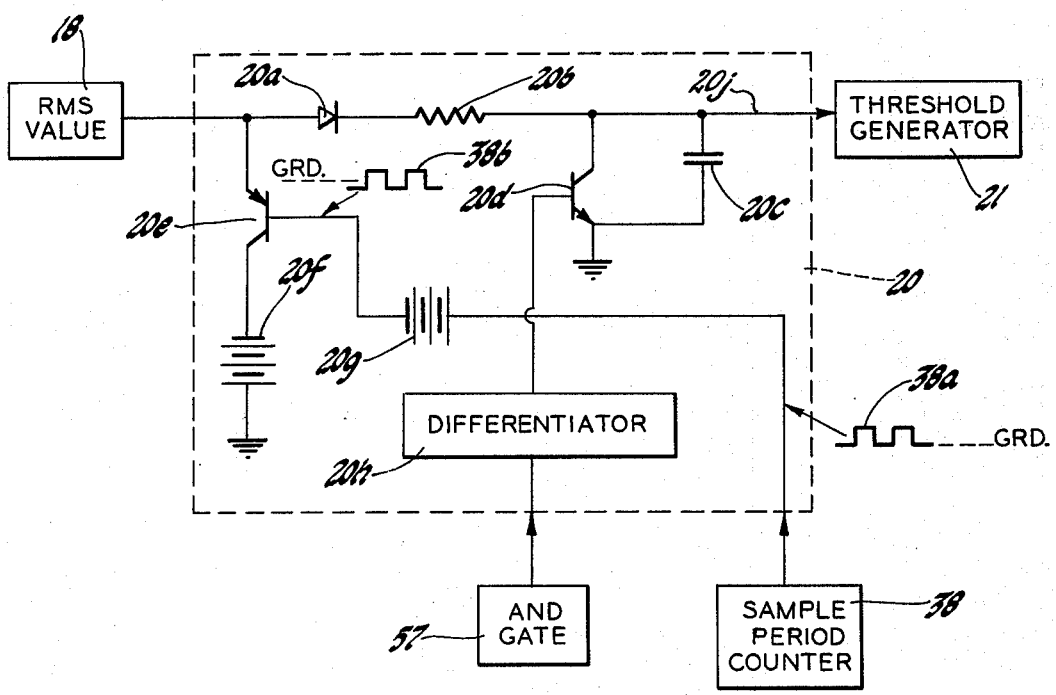
FIG. 6 is a circuit diagram illustrating an embodiment of a sample and hold circuit for use in the system of FIG. 3.
Figure 7:
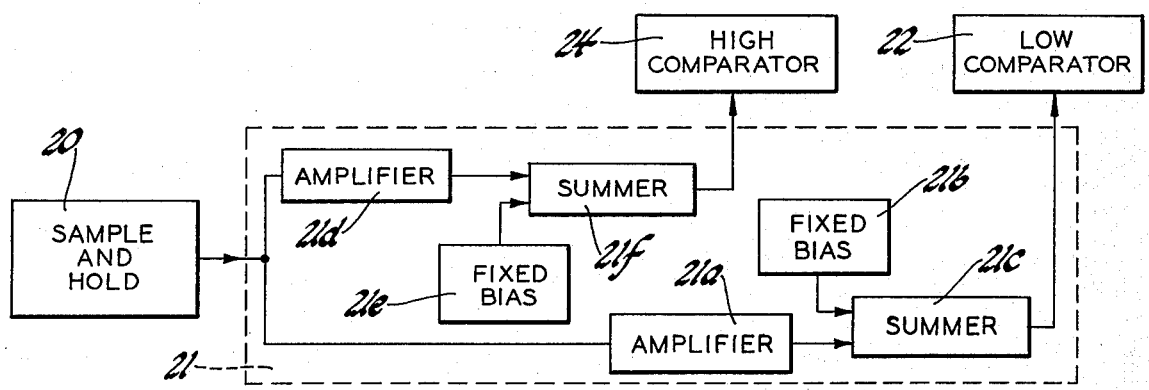
FIG. 7 is a block diagram illustrating the threshold generator in the system of FIG. 3.

It has been shown, to this point, how the spark timing of an engine may be retarded from its normal setting by elongation of the normal dwell pulses by varying amounts according to the output of a knock detector 64. A specific embodiment of such a knock detector 64 according to this invention is illustrated in FIGS. 3, 6 and 7 and described hereinafter.

Briefly, knock is sensed by an engine-mounted accelerometer 10 and compared with a generated reference threshold to produce countable pulses indicative of knock intensity. Further apparatus serves to gate a memory 28 or a memory 34 to a knock-indicating output condition when a preset number of ringing vibration pulses due to knock occur for either of the count periods used with the respective memories. That is, gated memory 28 has a knock-indicating output condition at the conclusion of the relatively short high level counting period if, during the counting period (e.g., 90 crankshaft), the ringing oscillations exceed the high level threshold by the high level counting number (e.g. three). Similarly, gated memory 34 has a knock-indicating output condition at the conclusion of the relatively long low level counting period if, during the counting period (e.g., three combustion events or approximately 270 crankshaft), the ringing oscillations exceed the low level threshold by the low level counting number (e.g., twelve). These knock-indicating output conditions, if any, are applied to an AND/OR gate 30, the output of which is sensed momentarily at the end of each low level count period as hereinafter described to retard the engine spark by a predetermined amount (e.g., four crankshaft) in the respective next succeeding low level count period.

Conversely, if neither memory 28 nor memory 34 has achieved a knock-indicating output condition during the low level count period (e.g., each 270° of crankshaft rotation) there is no retard signal from gate 30 at the end of the low level count period and the spark is advanced, if possible, by a preset increment, such as 4°, toward the previously defined unretarded spark timing.

SENSING APPARATUS

Figure 1:
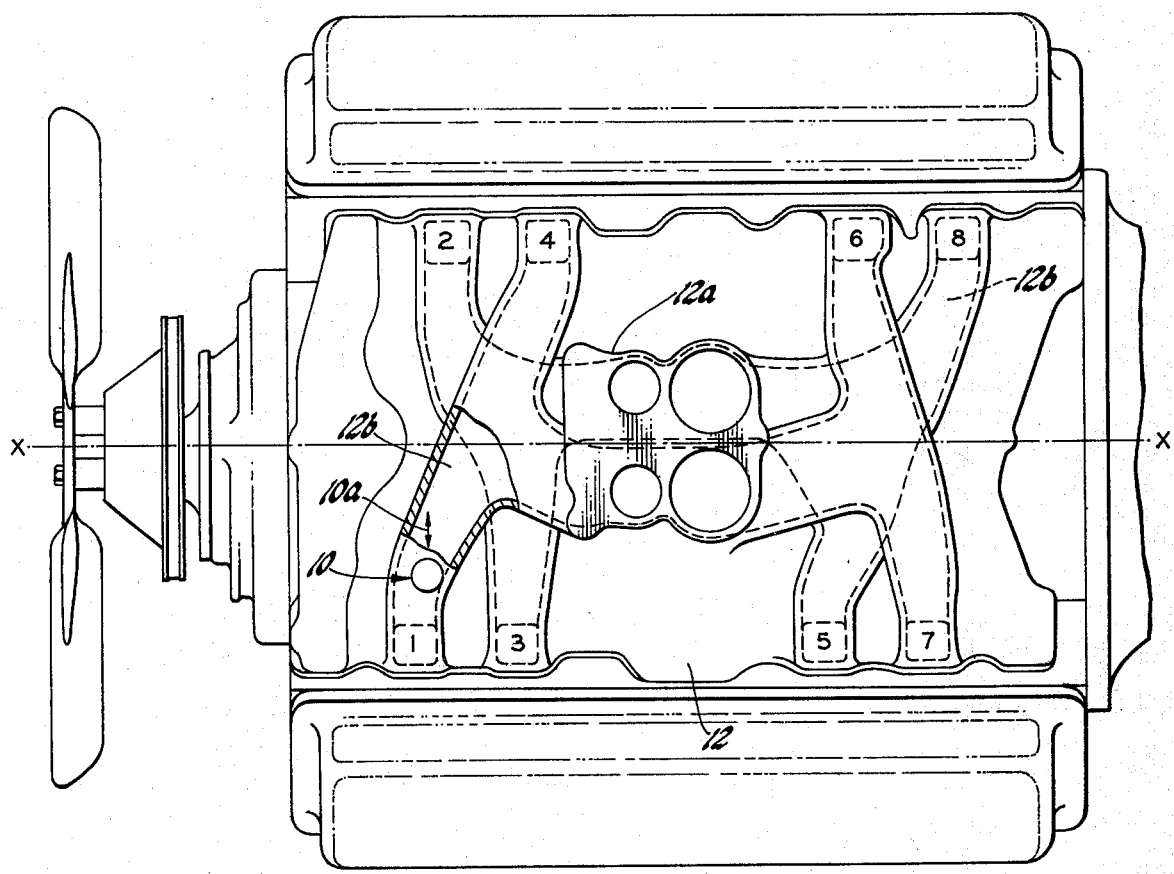
FIG. 1 is a top plan view of a V-8 engine with an accelerometer mounted on the intake manifold as used in the practice of the present invention.

In accordance with the present invention, knock or detonation is sensed at a low level by an accelerometer 10 affixed to the intake manifold 12 of a V-8 engine shown in general top plan view in FIG. 1. Flat pad portion 12a of intake manifold 12 receives a carburetor (not shown) in conventional fashion. The passages 12b of the manifold terminate in the respective outlets of the manifold indicated by the numerals 1 to 8, inclusive, to deliver the fuel-air mixture from the carburetor (not shown) to the respective engine cylinders as depicted by slashed lines.

The sensor may be any device capable of producing an electric signal in faithful response to the individual vibrations of the intake manifold during the low level ringing oscillations following the low level of knock or detonation that is to be sensed. A Columbia Research Laboratories Model 504–1 piezoelectric accelerometer mounted in the position shown in FIG. 1 has been used successfully with a standard 350 cubic inch V-8 automobile engine. This accelerometer has a 0-10 kHZ band width and a 50 kHZ natural frequency, is capable of responding to accelerations in the range from 0 to 2000 g, and acceptably responds to the individual ringing oscillations to be counted as hereinafter described. In approximately the position shown, it has been found to respond to knocking combustion events in any of the eight cylinders, although other locations may provide equal or better response. Other accelerometers with generally similar response characteristics may be used. The accelerometer is mounted to respond primarily to surface vibrations of the intake manifold structure. Maximum amplitude of these surface vibrations occurs along an axis normal to the surface. Accelerometer 10 is bolted to the intake manifold so that its most sensitive axis is likewise normal or perpendicular to the local surface area where it is affixed.

When the engine is running, the accelerometer experiences irregular alternating accelerations in accordance with the particular speed and torque of the engine. These accelerations as sensed may vary from fairly uniform peaks of less than 3g, in the previously mentioned engine, at a light load and speed of perhaps 3 horsepower and 1600 rpm, to peaks on the order of 20g or more at heavier load and higher speed within the range of normal engine operation. These vibrations are continuous forced vibrations of the intake manifold due to opening and closing of the valves and other effects and do not indicate the presence of detonation or knock.

When any cylinder of the engine experiences explosion or abrupt burning of the fuel/air mixture in the end gas region of the cylinder, as occurs with knock or detonation, ringing vibrations are sensed by the accelerometer. These ringing vibrations are generated by the mechanical shock associated with the detonation. When the degree of knock or detonation is sufficiently great, these ringing vibrations produce acceleration peaks or excursions outside the range of the background accelerations due to the engine operation. It has been found that these ringing vibrations produce excursions outside the range of the background vibrations in an amount sufficient for reliable detection even though the amount of "detonation" or "knock" is well below the amount that produces engine damage, reduces engine efficiency, creates unacceptable "pinging" noise or otherwise has the undesirable characteristics that normally dictate engine operation free of "knock" or "detonation".

Figure 2:
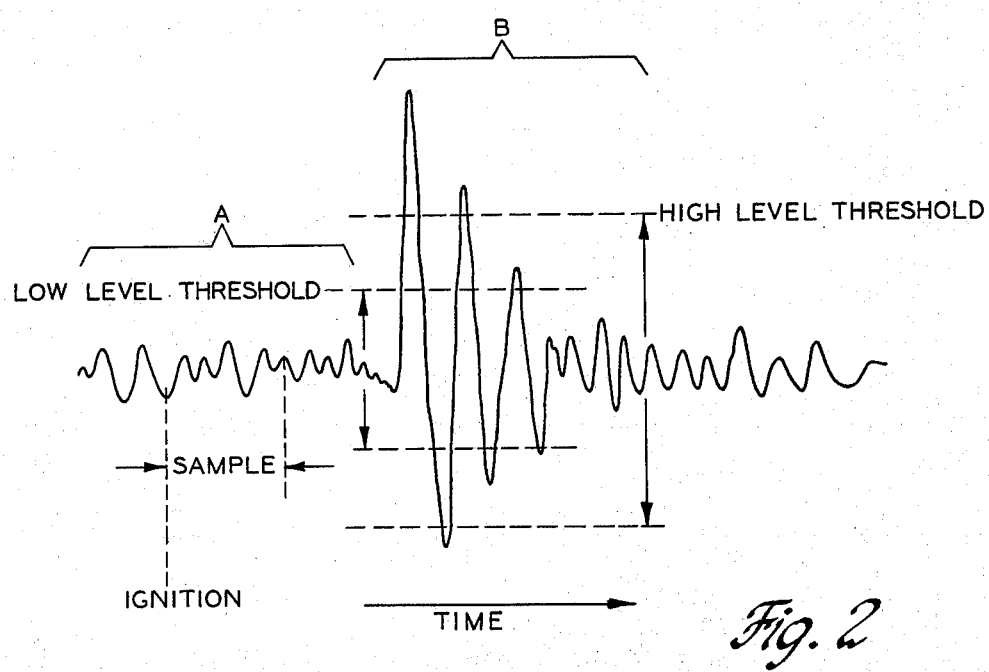
FIG. 2 is a diagram showing the output signal of the accelerometer just before, during and after a combustion event, with explanatory legends.

FIG. 2 shows an illustrative accelerometer response trace just before, during and after a detonation event. In the portion indicated at A, the accelerations sensed are the relatively low level oscillations associated with the vibration "noise" of engine operation. While ignition occurs in this period, there are no ringing oscillations at the accelerometer even if knock occurs later on during the combustion event. This condition persists for a short time after ignition occurs in each cylinder, as indicated by the time of ignition indicated on FIG. 2 and the period identified as "sample" thereafter. Commencing at a later time, indicated at B, the accelerometer senses the ringing oscillations associated with detonation, if present. These oscillations are damped and thus decay with time as shown. The magnitude of these ringing oscillations, and the sensor signal excursion that takes place, are determined by the intensity of the knock or detonating event. As shown in the illustrative trace of FIG. 2, these knock excited ringing oscillations are roughly sinusoidal, although they display substantial nonsinuosoidal variations.

In a preferred embodiment of this invention, the number of excursions of the knock excited ringing oscillations above the magnitude indicated as "low level threshold" is sensed and counted for a low level counting period measured in terms of engine revolutions or fractions thereof. For the particular trace shown in FIG. 2, this number is six. Further, in accordance with one embodiment of the present invention, the number of excursions of the knock excited ringing oscillations above a greater magnitude indicated as "high level threshold" is sensed and counted for a much shorter high level counting period, also measured in terms of engine revolutions or fractions thereof. For the particular trace shown in FIG. 2, this number is three. These counts are utilized as hereinafter described to vary the spark timing of the engine. The low level threshold is established by sampling the background accelerations for a short time period after ignition as indicated by the "sample" legend in the lower trace of FIG. 2, as is hereinafter described. The high level threshold is established in a like manner but the value is greater so that a substantially more vigorous knocking or detonation is required to exceed the high level threshold. Account is thereby taken of the varying amounts of such background accelerations so that the low level and high level counts represent only the excursions of the ringing oscillations beyond the respective threshold levels set by the background accelerations and consequently only the occurrence of knocking or detonation events that are of severity exceeding the preselected low level and high level amounts.

THRESHOLD GENERATION AND COMPARISON

Figure 4:
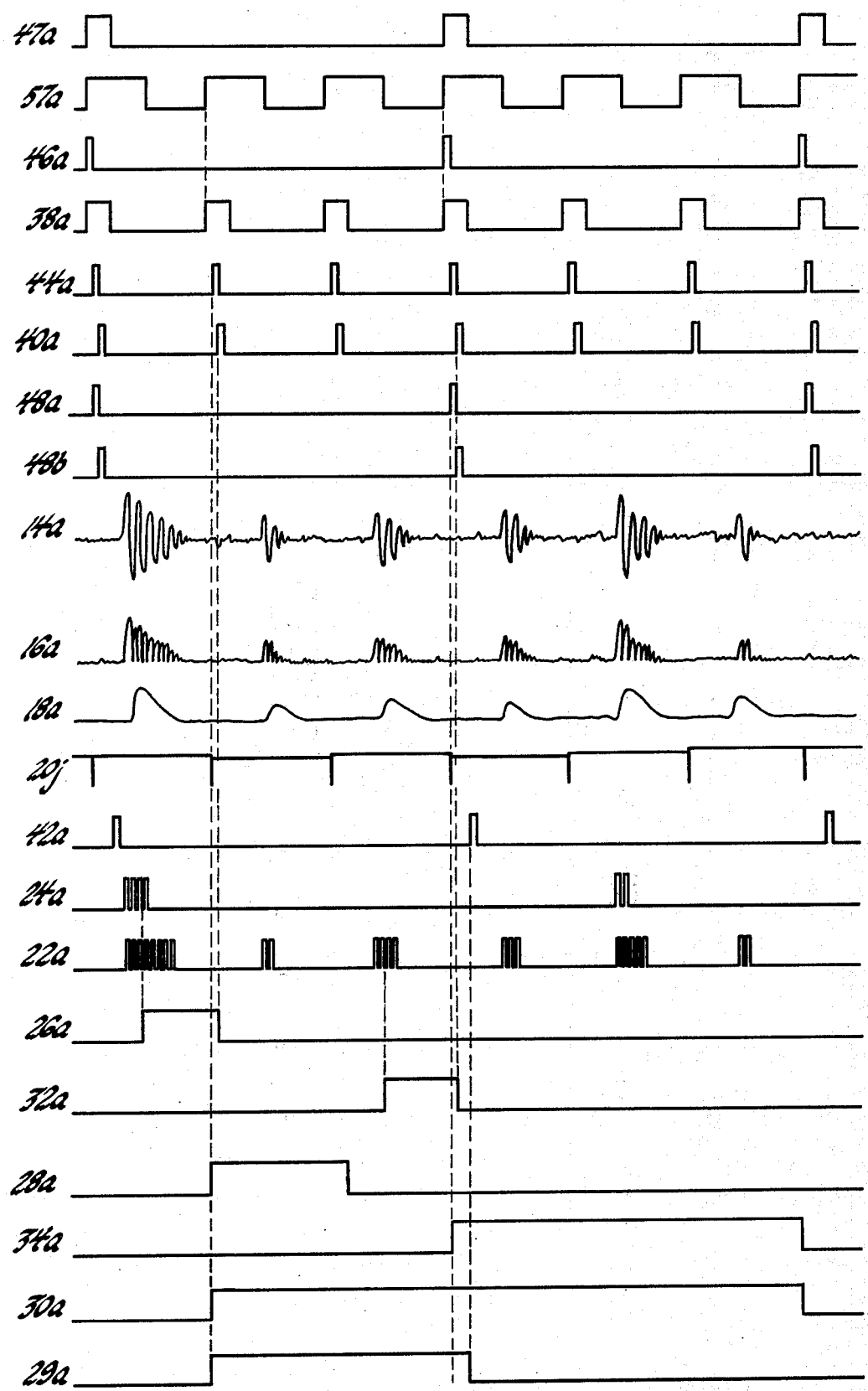
FIG. 4 is a chart showing various wave forms provided in the apparatus of FIG. 3 on a common time base and over seven consecutive spark events.

To assist the reader is understanding the construction and operation of the apparatus of FIGS. 3, 6 and 7, various waveforms are provided in FIG. 4, where they are depicted on a common time base, or at other appropriate points in the Figures. Referring to FIGS. 3 and 4, accelerometer 10 feeds an amplifier 14, which produces an amplified signal, which is a substantial replica at increased amplitude of the accelerometer signal. The shape of this signal is depicted for a number of combustion events at 14a, FIG. 4, and for an illustrative sample event in FIG. 2.

This signal is applied to an RMS value circuit 18, FIG. 3. The RMS value circuit may, for example, include a full wave rectifier (not shown) that converts the amplified alternating signal outputs of the accelerometer to successive unidirectional pulses. These unidirectional pulses can be passed through a low pass filter (not shown) to obtain an RMS value which appears as the output of RMS valve circuit 18, a representative example of which is illustrated by trace 18a in FIG. 4.

The output of RMS value circuit 18 is applied to a sample and hold circuit 20, shown in detail in FIG. 6. The input from RMS value circuit 18 is applied to the cathode of a diode 20a, the anode of which is connected through a resistor 20b to one side of a capacitor 20c and the collector of an NPN transistor 20d. This latter junction provides an output for circuit 20 to a threshold generator circuit 21, to be described later. The cathode of diode 20a is connected to the emitter of a PNP transistor 20e, the collector of which is connected to the negative side of a voltage source 20f and the base of which is connected to the negative side of another voltage source 20g. The positive side of voltage source 20f, the emitter of transistor 20d and the other end of capacitor 20c are all grounded. The positive side of voltage source 20g is connected outside circuit 20 to the output of a sample period counter 38; while the base of transistor 20d is connected through a differentiator 20h to the output of OR gate 57. Differentiator 20h can be chosen from a variety of passive or active differentiating elements known in the art.

In operation, the output of RMS value circuit 18, trace 18a in FIG. 4, is applied to the emitter of transistor 20e and the cathode of diode 20a. When transistor 20e is conducting, diode 20a is backbiased by voltage source 20f and signal 18a is blocked. When transistor 20e is non-conducting, however, signal 18a is passed through diode 20a and resistor 20b to charge capacitor 20c. A short time constant (e.g., 20 microseconds) defined by resistor 20b and capacitor 20c is used to cause the capacitor charge to reach a value approximating the applied signal 18a following a reset of capacitor 20c to a zero charge state. A discharge path for capacitor 20c, when transistor 20e is conducting, is through the combined input impedances of the elements included in threshold generator 21. The capacitance of capacitor 20c is selected so that its discharge time constant with these input impedances is large relative to the holding period between sample periods and its stored voltage remains essentially constant therethrough. A short pulse (e.g., 4 microseconds) from differentiator 20h to the base of transistor 20d at the moment of spark ignition renders transistor 20d briefly conducting to discharge capacitor 20c at the beginning of each sample period and thus reset it for a new sample.

The timing and length of each sample period is derived from sample period counter 38, to be further described later, which produces a train of positive-going square pulses as shown in trace 38a, FIG. 6. Each pulse, beginning at the time of an ignition event and lasting a constant predetermined number of engine degrees of crankshaft rotation, is applied through voltage source 20g to the base of transistor 20e. Voltage source 20g represents any clamping device effective to lower waveform 38a about 1 or 2 volts with reference to ground as seen in waveform 38b, FIG. 6. This ensures a negative voltage to turn transistor 20e "on" at the downward-going trailing edge of each pulse 38b even if the voltage from RMS value circuit 18 drops close to ground. The upward-going leading edges of pulses 38b are of sufficient amplitude to turn transistor 20e "off" regardless of the voltage from RMS value circuit 18.

Thus, it is seen that the charge on capacitor 20c is quickly brought to zero at the beginning of each sample period and allowed to rise during each sample period to a value determined by the RMS value of the noise vibration sensed by the accelerometer, and that charge is maintained (with slight decay) during the subsequent period when knock-generated ringing vibration can occur, until the next sample period. The charge on capacitor 20c, which is the output of sample and hold circuit 20, is shown as trace 20j, FIG. 4.

A detailed description of threshold generator 21 is shown in FIG. 7. Threshold generator 21 supplies, from the signal produced by sample and hold circuit 20, a low threshold signal and a high threshold signal for comparison with the output of absolute value circuit 16.

To generate the low level threshold, the signal from sample and hold circuit 20 is applied to an amplifier 21a, the ouput of which is added to a fixed bias from fixed bias generator 21b in a summer 21c. The output of summer 21c is the low level threshold. Similarly the output of sample and hold circuit 20 is multiplied in an amplifier 20d, to which product is added the output of a fixed bias generator 21e in a summer 21f to produce the high level threshold. The low and high level threshold portions of circuit 21 are independent of each other and either can be omitted if that particular level comparison is not desired.

Figure 8:
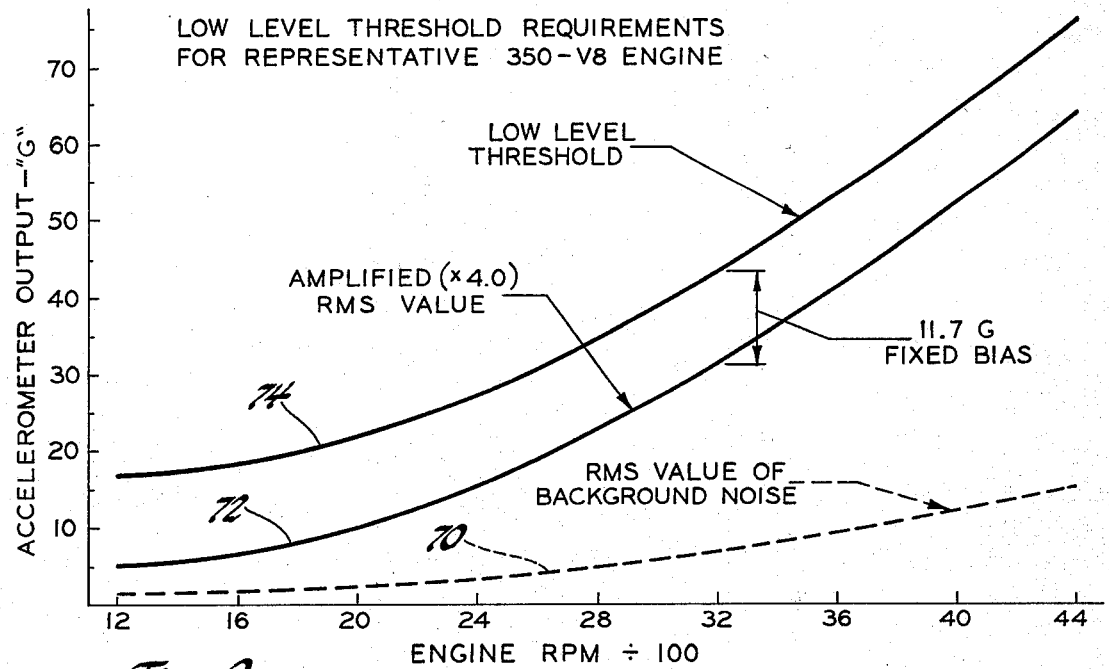
FIG. 8 is a graphical illustration of the operation of the threshold generator of FIG. 7 at varying engine speeds.

Threshold or borderline levels of engine knock are commonly defined as a function of engine speed as the knock that can be barely heard by an occupant of a vehicle equipped with the engine. However, the background noise appearing in the output of accelerometer 10, the RMS value of which is sampled in sample and hold circuit 20, does not necessarily vary with borderline knock. For example, in a representative V-8 engine, as shown in FIG. 8, the RMS value of background noise as sensed by the accelerometer is shown in curve 70 as it varies with engine speed from 1200 RPM to 4400 RPM. This curve could represent the variation with engine speed of the input to amplifier 21a.

Curve 72 of FIG. 8 shows a typical amplified reproduction of curve 70 with an amplification factor of four. This might typically represent the variation with engine speed of the output of amplifier 21a. It will be noticed that, over the range of engine speeds shown, curve 70 exhibits a minimum of 1.25 g (as measured by accelerometer 10) and a maximum of 16.0 g for a ratio of maximum RMS value to minimum RMS value of 12.8:1. Naturally, the amplified signal 72 has the same maximum to minimum ratio of 12.8:1. However, over the same engine speed range, the output of accelerometer 10 corresponding to a low level knock of borderline intensity will range from a minimum of 16.7 g to a maximum of 76 g to give a maximum to minimum ratio of 4.55:1. Since the background accelerometer noise ratio of 12.8:1 does not match the borderline knock intensity ratio of 4.55:1, a fixed bias 21b is added to the amplified RMS value of background noise to obtain curve 74 which has a maximum to minimum ratio of 4.55:1 and thus more closely approximates the desired relationship for sensing borderline knock. Fixed bias from 21e is supplied for the same reason.

If these fixed biases from fixed bias generators 21b and 21e are not added to the outputs of amplifiers 21a and 21d, then the knock detector will not provide thresholds giving the optimum knock intensities over the complete range of engine speed. Parameter values shown in FIG. 8 are only representative; and it should be understood that gain settings for the amplifiers 21a and 21d and the output of fixed bias generators 21b and 21e must be experimentally determined for each engine design.

The low level threshold for summer 21c is applied to one input of a low comparator 22; while the high level threshold from summer 21f is applied to one input of a high comparator 24. The outer inputs of low comparator 22 and high comparator 24 are the output of an absolute value circuit 16, to which is applied the output of amplifier 14 as shown in FIG. 3. Absolute value circuit 16 may contain full wave rectifier means so as to produce a train of unidirectional pulses corresponding to the positive and negative pulses of the signal from amplifier 14. A representative sample is shown in trace 16a, FIG. 4. Low comparator 22 and high comparator 24 are both devices of the type which may include a differential amplifier having one input fed by a signal from absolute value circuit 16 and the other input fed by the respective threshold level signal. Illustrative differential amplifiers are described at page 343–347 of Rider, "Electronic Fundamentals and Applications" (Prentice-Hall, Fourth Edition, 1970). Each of the low and high level comparators 22 and 24 generates an output composed of a series of unidirectional pulses derived from the portions of those pulses of the signal from absolute value circuit 16 which exceed the respective threshold level supplied to the comparator from threshold generator 21. Samples of the outputs of low comparator 22 and high comparator 24 are shown as traces 22a and 24a, respectively, in FIG. 4.

DIGITAL SIGNAL PROCESSING

The output of accelerometer 10 having been reduced to a series of pulses from low comparator 22 and high comparator 24 representing the accelerations measured by the accelerometer 10 in excess of certain threshold levels derived from the RMS value of the signal from accelerometer 10, the remaining signal processing is accomplished with digital apparatus. Clock pulses for actuating the digital apparatus are obtained from OR gate 57, which provides an upward-going pulse at the point of each spark ignition, and from amplifier 50d, which provides a positive-going pulse for each engine degree of crankshaft rotation. For an eight cylinder engine, there will be an average of ninety pulses 50e for every pulse 57a from OR gate 57, although the number of pulses 50e between any two adjacent pulses 57a, shown in FIG. 4, may vary from that number because of variations in spark timing produced by the system.

Sample period counter 38 has already been mentioned as the device which controls the sample period in the sample and hold circuit 20. Sample period counter 38, shown in FIG. 3, is supplied with pulses from OR gate 57 and amplifier 50d. The upward-going edge of pulse 57a actuates counter 38 to begin counting pulses 50e and further generates a high level output applied to voltage source 20g in sample and hold circuit 20. When the count in counter 38 reaches a predetermined number, such as 16 (corresponding to 16 engine degrees of crankshaft rotation), counter 38 generates a reset pulse and reverts to the "off" or noncounting condition, at which point the voltage to voltage source 20g drops to ground. The resultant output is a train of square pulses having leading edges varying with spark timing but a constant pulse width of, for example, sixteen engine crankshaft degrees, as shown in trace 38a, FIG. 4.

The positive pulses of trace 38a thus determine the sample period as shown in FIG. 2 beginning with spark ignition and during which no knock or detonation is experienced. The time represented by the ground level signal between these positive pulses, however, is the time when knock or detonation events can occur and during which output pulses will be generated by low comparator 22 and high comparator 24. A significant result of this arrangement is that, since no engine knock signals are present during the sample period, the threshold levels will be unaffected be engine knock intensity and thus represent true background noise levels.

Referring again to FIG. 3, a preset counter referred to as long counter 32 is set and reset by pulses from a logic gate 48 in a manner described in further detail hereafter. In one form of the apparatus, counter 32, when set or reset, has a zero count. The counter is sufficiently rapid to execute an additional count in response to each pulse from comparator 22, that is, on each of the excursions of the accelerometer output above the level fixed by the low level threshold. Counter 32 is preferably a binary counter which activates an output circuit upon reaching a predetermined count, such as 12. Hence, counter 32 progressively counts those excursions of the accelerometer output above the low level threshold until twelve such counts (for example) are made, whereupon the counter activates the output circuit and supplies a high or knock-indicating signal to a gated memory 34. Counter 32 retains this high output condition until reset by the next pulse from logic gate 48. Trace 48b, FIG. 4 shows the activating pulses from logic gate 48 applied to long counter 32. Trace 32a, FIG. 4, illustrates the output of long counter 32.

Gated memory 34 receives a different series of activating pulses from logic gate 48, shown as trace 48a, FIG. 4, one pulse just after the end of each low level count period and just before reset pulse 48b to transfer the output condition of counter 32 to gated memory 34. Memory 34 includes a flip-flop or other memory device that assumes an output condition upon the receipt of pulse 48a from logic gate 48 and holds this output condition until the receipt of the next succeeding pulse 48a. The output condition of memory 34, either high or low, following any pulse 48a is the same as the output condition of long counter 32 at the time of that pulse. Thus memory 34 is gated to read the output of long counter 32 at the end of each low level counting period, assume that condition and maintain it throughout the succeeding low level counting period.

The low level counting period is to be determined for each engine application as that number or fraction of crankshaft revolutions which produces optimal system operation or is most convenient for other reasons. A typical low level counting period for an eight cylinder engine, for example, is two engine crankshaft revolutions; although this is not necessarily the best duration.

The low level sample period for the system of this embodiment was chosen to be three spark ignition events or approximately 270° of engine crankshaft revolutions for purposes of illustration only, so that a number of such low level sample periods could be illustrated in the traces of FIG. 4.

Thus, gated memory 34, throughout each low level counting period of three spark ignition events or approximately 270° crankshaft rotation, has a high or low output condition depending upon whether the number of ringing oscillations in trace 16a which exceed the low level threshold in low comparator 22 exceeded or did not exceed the preset count of twelve in long counter 32 during the preceding low level counting period. Further, the reading of the output of counter 32 by gated memory 34 and subsequent resetting of counter 32 are both timed to occur during a sample period, when there are no pulses to be counted.

The high level knock or detonation counting circuitry includes short counter 26, gated memory 28 and shift register 29, all following high comparator 24. Short counter 26 is a preset counter similar to long counter 32, but is set to count to a smaller number. For example, short counter 26 may produce a high or knock-indicating output upon the count of three, so that three excursions of trace 16a above the high level threshold, as detected by high comparator 24, are sufficient to produce the high output signal in short counter 26. The resultant output trace is indicated at 26a, FIG. 4.

Short counter 26 receives its reset pulse from a reset counter 40 just after the beginning of each high level counting period, for example, just after every spark ignition event in an eight cylinder, four stroke cycle engine. Exemplary reset pulses, from a counter 40, are shown as trace 40a, FIG. 4. Gated memory 28 is preferably similar to gated memory 34, but receives its count-reading signal from a counter 44, the output of which is shown as trace 44a, FIG. 4. The resultant output from gated memory 28 is indicated at trace 28a, FIG. 4, Shift register 29, which may be a simple flip-flop device, is a two-valued output device which is set or reset to a low output by a reset pulse 42a from reset counter 42 and is switched to a high output by a high input from gated memory 28. Having been switched to the high output, knock-indicating conditon during any high level counting period, register 29 retains this output until reset at the beginning of the next low level counting period. Thus, no matter which engine cylinder first reaches a high knock level, the high level knock circuitry will "remember" it through the longer low level counting period to maintain a knock-indicating signal for left-right shift register 52.

Thus the high level knock or detonation sensing circuitry operates differently from the low level knock or detonation sensing circuitry, in that (1) it senses only ringing oscillations above a higher threshold level than the low level circuitry; (2) a smaller number of counts is required to reach the count level of counter 26; (3) counter 26 is reset to make a new count over a shorter period, such as approximately 90 degrees if crankshaft rotation; (4) gated memory 28 holds its output condition for essentially the same shorter period, such as approximately 90 degrees of crankshaft rotation; and (5) shift register 29 is included to retain information that excessive high level knock has occurred until it can be utilized by left-right shift register 52.

The outputs of shift register 29 and gated memory 34 are applied to inputs of an AND/OR gate 30, also known as an inclusive OR gate, which produces a high or knock-indicating output whenever either shift register 29 or gated memory 34 or both have high or knock-indicating outputs. The output of gate 30, trace 30a in FIG. 4, is applied to left-right shift register 52 as previously described.

The previously mentioned counters 40 and 44 are similar devices which each are supplied with pulses from OR gate 57 and amplifier 50d. Each of counters 40 and 44 is actuated by the spark producing pulse of OR gate 57 to begin counting pulses 50e. Gate counter 44 counts pulses 50e up to a preset number of counts, such as eight, at which time it resets and is quiescent until a new counting sequence is initiated by a pulse of trace 57a, FIG. 4. When this counter resets, a pulse appears in the reset circuit, which pulse is supplied to gated memory 28 to cause gated memory 28 to read the output of short counter 26 and set its own output accordingly.

Reset counter 40 counts pulses 50e up to a preset number, such as twelve. Upon completion of this count, the counter resets and assumes the non-counting state which continues until the next count is started by a new pulse from OR gate 57. The reset pulse of this counter is applied as its output pulse to short counter 26 to reset the same. It should be noted that the higher count of reset counter 40 produces a later output pulse than the lower count of gate counter 44. This ensures that gated memory 28 will read the output of short counter 26 before short counter 26 is reset. Thus, reset counter 40 must always be set to count a greater number of pulses 50e that gate counter 44. In addition, both counters 40 and 44 are set to reach their reset counts and supply their output reset pulses within the sample period as determined by counter 38: in this example, within sixteen engine crankshaft degrees. This ensures that the logical switching of gated memory 28 and AND/OR gate 30 and the reset of short counter 26 will take place within the sample period.

As previously mentioned, the counting time of the long counter 32 extends over a number of spark ignition events; three in this example. Therefore, in this example, only every third pulse from counter 44 should be applied to gated memory 34 and only the immediately following pulse from reset counter 40 should be applied to long counter 32. To accomplish this, the system includes a divide by N counter 46 actuated by pulses from OR gate 57, a counter 47 actuated from divide by N counter 46 to count pulses 50e from amplifier 50d and a logic gate 48 which connects the outputs of counters 44 and 40 to gated memory 34 and long counter 32, respectively, when provided with an appropriate output from counter 47.

Divide by N counter 46, in order to control the low level count periods, produces an output pulse, in this example, with every third input pulse from OR gate 57. Each output pulse from divide by N counter 46 causes counter 47 to begin counting pulses 50e. Counter 47 continues counting pulses 50e up to a preset count which, for convenience, may be set equal to the sample period of sixteen, at which time it generates an internal reset pulse and returns to the inactive state until the next enabling pulse is received from divide by N counter 46. Counter 47 is similar in operation to counter 38 in that its output switches to an "on" signal as it starts counting and switches back to an "off" signal when it finishes counting and resets.

Logic gate 48 can be any device known in the art to simultaneously connect two parallel circuits, namely gate counter 44 to gated memory 34 and reset counter 40 to long counter 32, when an "on" signal is received from counter 47 and simultaneously disconnect these circuits when an "off" signal is received from counter 47. Thus, at the beginning of each low level counting period, during the sample period, a pulse will first be received by gated memory 34 to cause it to read the condition of long counter 32 and adjust its output accordingly and this will be quickly followed by a reset pulse to long counter 32. FIG. 4 includes illustrative examples of the output of counters 46 and 47 as traces 46a and 47a and the outputs of logic gate 48 as trace 48a from gate counter 44 and trace 48b from reset counter 40.

In addition, output 48b from logic gate 48 is supplied as the enabling pulse to left-right shift register 52 to cause it to read the output of AND/OR gate 30 and count up or down accordingly. The delay of the pulse in output 48b as compared to the gating pulses applied to gated memories 28 and 34 insures that the AND/OR gate 30 will have assumed its new value before its output 30a is read by the left-right shift register 52.

The output pulse from divide by N counter 46 is also provided to reset counter 42, which operates similarly to counters 40 and 44. Upon receipt of a pulse from divide by N counter 46, counter 42 starts counting pulses 50e, supplied from amplifier 50d, to a preset number, such as 16. When the preset number is reached, a reset pulse is generated in the output to reset shift register 29. A convenient time for this reset pulse is at the end of the sample period, sufficiently long after the pulse of trace 48b that left-right shift register 52, actuated by the latter, reads output 30a of AND/OR gate 30 before that output can be changed by the resetting of left-right shift register 29.

To summarize the operation of the knock detector, therefore, the amplified signal from amplifier 14 representing accelerations in the engine sensed by accelerometer 10 is fed through an absolute value circuit 16 to comparators 22 and 24 and through an RMS value circuit 18 to the sample and hold circuit 20. At the time of each spark ignition event within the engine, a pulse from OR gate 57 simultaneously resets sample and hold circuit 20 for a new sample and enables counters 38, 40 and 44 to begin counting upward. During the sample period, which may be sixteen degrees of engine crankshaft rotation, sample and hold circuit 20 samples the signals from RMS value circuit 18, gated memory 28 reads the output of short counter 26 to generate an appropriate output and short counter 26 resets to begin a new count. During every third (for example) sample period, counter 47 opens logic gate 48 to cause gated memory to read long counter 32 and long counter 32 to thereafter reset its next count; and counter 42 causes shift register 29 to reset at the end of the sample period. AND/OR gate 30 generates a knock-indicating output as long as either shift register 29 or gated memory 34 have such an output; and this output is maintained until the next pulse from gate counter 44.

From the end of the sample period, caused by the resetting of sample period counter 38, until the beginning of the next sample period, caused by a new pulse from OR gate 57, sample and hold circuit 20 supplies a substantially constant output to threshold generator 21, which generates high and low thresholds for application to high comparator 24 and low comparator 22 and comparison therein with the output of absolute value circuit 16. Short circuit 26 counts knock excursions above the high threshold level until the beginning of the next sample period; while long counter 32 counts excursions above the low level threshold until the beginning of the third sample period after the present period.

The high level counting circuitry fulfills two functions in this embodiment. The first is related to the fact that many engines knock more intensely on one or two cylinders than on the others. The high level counting circuitry, because of its small count number (3 in this embodiment) will detect high level knocking on one or two cylinders that might not create sufficient counts in the low level circuitry (12 counts in this example) to indicate knocking. Since a new high level counting period is started on each engine spark event, each such period, in effect, measures the knock in a different cylinder. Shift register 29 will retain in excessive knock signal from any of the cylinders until it is acted on after the end of the low level counting period.

The second function of the high level counting circuitry is to provide quicker response by the system to an unacceptable knock intensity which begins during the latter part of the low level counting period. Even though such a knock will increase the number of low level counts, if it begins late in the low level period and the knock intensity up to that point has been low, the low level count might not reach the preset knock limited value within the remainder of the low level period. In this case, in the absence of the high level counting circuitry, the system would not respond to this knock until the end of the following low level period; however, the condition is sensed by the high level counting circuitry just before the end of the low level counting period in time to cause a spark timing retard for the next low level counting period.

Thus, both high and low level counting circuitry contribute in somewhat different ways to the operation of this embodiment. For different engines and requirements, however, the invention may be used in simplified form with either the high level knock circuitry or the low level knock circuitry as the sole knock detecting circuitry. In addition, the exact numerical value of the preset parameters of the various counters and other circuit elements will depend, within any broader limitations mentioned in this specification, upon the specific engine application requirement and form of the invention chosen.

AN ALTERNATIVE EMBODIMENT

Figure 9:
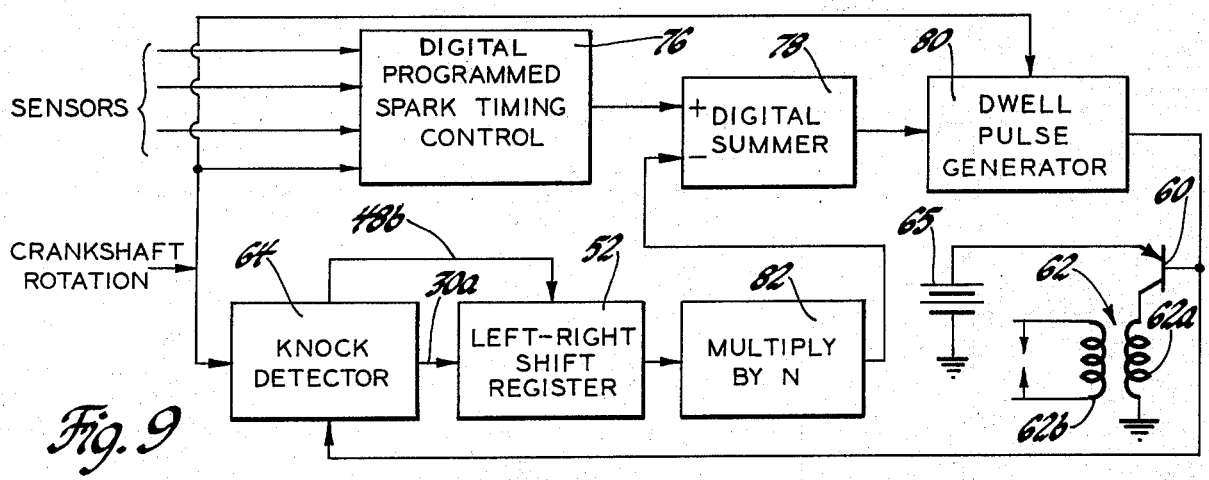
FIG. 9 is a diagram in block form of an alternative embodiment, according to this invention, of the system shown in FIG. 5.

A modified form of the invention may be used with a digital electronic spark timing control system, as shown in FIG. 9. Such a system normally includes a programmed spark timing control 76, which ordinarily controls spark timing by program means including memory, algorithm or both in accordance with inputs from various sensors, not shown, giving information concerning crankshaft rotation, intake manifold pressure, atmospheric pressure, engine temperature, and other factors affecting engine operation. The output of programmed spark timing control 76 comprises a series of digital words, each of which specifies a number of degrees or fractions thereof of crankshaft rotation in advance of, or retarded from, a reference crankshaft rotation such as top dead center.

The digital number from control 76 is supplied to a digital summer 78, in which it is added to another digital number indicative of the amount of spark timing retard specified by apparatus responsive to engine knock. In this embodiment, a larger positive or smaller negative digital number produces a more advanced spark while a smaller positive or larger negative digital number produces a more retarded spark. Therefore, the second digital number is converted to a negative number or subtracted within digital summer 78.

The output of digital summer 78 is the difference, therefore, between the first and second digital inputs thereto. This output is supplied to a dwell pulse generator 80, which also receives crankshaft rotation information to produce an output dwell pulse effective to switch drive transistor 60 to actuate spark coil 62 from voltage source 65.

The second digital number is derived from knock responsive apparatus comprising a knock detector 64 and left-right shift register 52, already described in this application, and a multiply by N counter 82, which receives the output of left-right shift register 52, multiplies it by a preset number N and supplies the resulting product as the second digital number to digital summer 78. The number N in multiply by N counter 82 and the ratio of one digit in the digital numbers to one degree of crankshaft rotation provide an adjustment in the response of the system to varying engine knock level and may be determined experimentally for a particular engine and system. For instance, if the digital output of programmed spark timing control 76 has a correspondence of one digit to one degree of crankshift rotation and the number N is preset at four, then the system will be capable of retarding the spark from or advancing the spark to the programmed spark timing by 4° of crankshaft rotation each time left-right shift register 52 reads output 30a of knock detector 64.

In operation, whenever left-right shift register 52 has a zero count, the output of programmed spark timing control 76 is passed unchanged through digital summer 78 and thus determines spark timing. As left-right shift register 52 counts upward from zero when excessive engine knock is detected, successively larger digital numbers are supplied to digital summer 78 to be subtracted therein from the output of programmed spark timing control 76 and thus retard the spark from its programmed setting. As left-right shift register count down toward zero following a change from excessive knock to acceptable knock, the digital numbers supplied from multiply by N counter 82 decrease and the spark is advanced toward its programmed setting.

In the foregoing specification, reference is made from time to time to low level and high level knock detonation. The intensity of even the high level knock, above described, is very low in relation to the degree of knock or detonation that may damage the engine. Further, only a few cylinders, at most, in normal operation typically produce borderline knock or detonation here described, so that the actual knock maintained during knock limiting engine timing control as herein described is both low in intensity and confined to one or a few of the total number of engine cylinders. In any event, the effect of the knock or detonation on engine life and deterioration is sufficiently small to permit continuous engine operation with such controlled knock or detonation.

In the foregoing specification and drawings, the terms "shift register" (55, FIG. 5) and "left-right shift register" (52, FIG. 5) are used to describe counters of the type wherein the counting functions are controlled as set forth. The term "counter" used in the appended claims includes these elements, which may, of course, be other forms of counters as well as the specifically described types. Further, in the appended claims, the term "sampler" is used to describe the elements indicated at 20, FIG. 3, which serve to sample the accelerometer signal during times when ringing vibrations cannot be present.

The RMS value unit indicated at 18, FIG. 3, is believed to provide an output that is generally in accord with the RMS value of the output of amplifier 14. However, it need not be strictly the RMS value but needs only to be some value representative of the general level of "noise" due to engine operation without the ringing vibrations due to knock. The term "average magnitude" in the appended claims is used to refer generally to apparatus providing a signal determined by such noise, which need not produce either a true RMS value, a mean, a median, or any other specific value so long as it does produce a signal which generally follows a "smoothed out" approximation of the accelerometer signal.

In the foregoing specifically described apparatus, the predetermined number of counts that gives rise to an increased spark retard and the predetermined number of counts that gives rise to a decreased spark retard are the same number. Thus, left-right shift register 52 counts either up or down at the conclusion of each counting period; and a count period does not pass without change in one direction or the other. In its more general aspect, however, the present invention contemplates the use of two different predetermined numbers of counts so arranged that when the number of counted ringing vibrations exceeds the greater predetermined number of counts the spark is retarded, when the number of counted ringing vibrations is less than the smaller predetermined number of counts the spark is advanced, and when the number of counted ringing vibrations is intermediate the two values, no change is made in the spark timing. One skilled in the art could easily modify the described apparatus to accomplish this by adding additional counters parallel to counters 26 and 32 and providing additional logic elements responsive to these counters and counters 26 and 28 to interrupt the application of signal 48b to left-right shift register 52 when the number of counted ringing vibrations is intermediate the two values and apply the proper input 30a to left-right shift register when the number of counted ringing vibrations is greater than the larger value or less than the smaller value.

The embodiments described are preferred embodiments only; and many equivalent embodiments will occur to those skilled in the art. In addition, many elements shown but not claimed may not be required for particular engines and operating requirements. Therefore, this invention should be limited only by the claims which follow.

The embodiments of the invention in which an exclusive property or privilege is claimed are defined as follows:

1. In an apparatus to generate sparking voltages at the spark electrodes of the respective cylinders of a spark ignition internal combustion engine in automotive application, the improvement comprising:
first means responsive at least to engine crankshaft rotation and effective to generate programmed spark voltage pulses and apply the same to the engine cylinders in sequence for the successive firings of each engine cylinder;
an accelerometer responsive to the background engine vibrations due to engine operation and the individual ringing engine vibrations due to engine knock;
a sampler responsive to the magnitude of the accelerometer signal during successive sample periods terminating, respectively, before ringing vibrations due to engine knock commence and effective to generate an output signal varying generally with the average magnitude of said accelerometer signal without said ringing vibrations;
a comparator simultaneously responsive to the sampler output signal and to the magnitudes of the individual ringing vibrations in said accelerometer signal and effective to generate a pulse each time the latter exceeds the former;
second means effective to count the number of said pulses during a predetermined counting time, said second means being further effective to change a stored number count in one direction by a predetermined number when the number of said pulses during said predetermined counting time exceeds a first reference number and to change said stored number count in the opposite direction by a predetermined number when the number of said pulses during said predetermined counting time does not exceed a second predetermined reference number no greater than said first predetermined reference number;
and means responsive to said second means to retard the sparking events due to said first means by a predetermined amount for each count stored by said second means and in sense to delay the spark as the second means senses increased numbers of ringing vibrations;
whereby knock intensity in said engine is limited to a desired level.

2. In an apparatus to generate sparking voltages at the spark electrodes of the respective cylinders of a spark ignition internal combustion engine in automotive application, the improvement comprising:
first means responsive at least to engine crankshaft rotation and effective to generate programmed spark voltage pulses and apply the same to the engine cylinders in sequence for the successive firings of each engine cylinder;
an accelerometer responsive to the background engine vibrations due to engine operation and the individual ringing engine vibrations due to engine knock;
a sampler responsive to the magnitude of the accelerometer signal during successive sample periods terminating, respectively, before ringing vibrations due to engine knock commence, and effective to generate an output signal varying with the average magnitude of said accelerometer signal without said ringing vibrations;
second means effective to count the number of individual ringing vibrations in said accelerometer signal that exceed said output signal by a predetermined low reference value during a predetermined first counting period and to count the number of individual ringing vibrations in said accelerometer signal that exceed said output signal by a predetermined higher reference value during a second predetermined counting period shorter than said first predetermined counting period, said second means being further effective to increase a stored number count by a predetermined number when either (a) the number of such vibrations in the first counting period exceeds a first predetermined reference count number or (b) the number of such vibrations in any of said second counting periods within the time of said first counting period exceeds a second predetermined reference count number smaller than said first reference count number and to decrease said stored number count by a predetermined number when both (a) the number of such vibrations in the first counting period is less than a predetermined number no greater than said first predetermined reference count number and (b) the number of vibrations in each of said second counting periods within the time of said first counting period is less than a predetermined number no greater than said second predetermined reference count number;

and means responsive to said second means to retard the sparking events due to said first means by a predetermined amount for each count stored by said second means the amount of said retard increasing with increasing stored count;

whereby knock intensity in said engine is limited to a desired level.

3. In an apparatus to generate sparking voltages at the spark electrodes of the respective cylinders of a vehicle mounted spark ignition internal combustion engine in automotive application, the improvement comprising:

first means responsive at least to engine crankshaft rotation and effective to generate programmed spark voltage pulses and apply the same to the engine cylinders in sequence for the successive firings of each engine cylinder;

an accelerometer responsive to the background engine vibrations due to engine operation and the individual ringing engine vibrations due to engine knock;

sampling means responsive to the magnitude of the accelerometer signal during successive sample periods terminating, respectively, before ringing vibrations due to engine knock commence and effective to generate an output signal indicative of the average value of said accelerometer signal during said sample periods;

means for generating a threshold signal from said output signal, said means comprising an amplifier effective to amplify said output signal by a fixed amount and means to add thereto a fixed bias, said fixed amount and fixed bias being predetermined to cause said threshold signal to approximate, over varying vehicle operating conditions, a level of engine knock just below that audible to an occupant of the vehicle;

a comparator responsive to the threshold signal and the magnitudes of the individual ringing vibrations in said accelerometer signal and effective to generate a pulse each time the latter exceeds the former;

second means effective to count the number of said pulses during a predetermined counting time, said second means being further effective to increase a stored number count by a predetermined number when the number of said pulses during said predetermined counting time exceeds a reference number and to decrease said stored number count by a predetermined number when the number of said pulses during said predetermined counting time does not exceed said reference number;

third means to generate a spark-creating voltage and apply the same to the engine cylinders in sequence; and means responsive to said second means to retard the firings due to said first means by a predetermined amount for each count stored by said second means, the amount of said retard increasing with increasing stored count;

whereby knock intensity in said engine is limited to said level just below that audible to an occupant of the vehicle.

4. In an apparatus to generate sparking voltages at the spark electrodes of the respective cylinders of a spark ignition internal combustion engine in automotive application, the improvement comprising:

an accelerometer responsive to background accelerations due to engine operation and to individual ringing vibrations produced by knocking combustion;

a sampler responsive to the signal of the accelerometer during the successive times immediately prior to the occurrence of ringing vibrations due to engine combustion events, if knocking combustion occurs;

a comparator responsive to the output of the sampler and the magnitudes of individual ringing vibrations effective to produce an output pulse for each ringing oscillation that exceeds a reference amount determined by the output of said sampler;

a first counter responsive to said pulses and effective to count the same during a predetermined counting period;

a second counter responsive to said first counter and effective to make an increased count whenever the first counter counts more than a predetermined number during said predetermined counting period and to make a decreased count whenever the first counter counts less than a predetermined number during said predetermined counting period;

means responsive to engine crankshaft rotation effective to generate a pulse for the sparking events of the respective cylinders and in predetermined timed relation to the respective piston positions, said timing being advanced from the times knock free combustion is certain to occur under all engine operation conditions;

a third counter effective in response to each last mentioned pulse to count in accordance with successive increments of crankshaft rotation up to a count determined by the count of said second counter; and means to generate a spark-creating voltage when said second counter reaches said count and to apply the same to the engine cylinders in sequence;

whereby spark events occur in the respective engine cylinders at times producing an average number of said individual ringing vibrations exceeding said reference amount, which average number is less than substantially the number of said first count.

5. In an apparatus to generate sparking voltages at the spark electrodes of the respective cylinders of a spark ignition internal combustion engine in automotive application, the improvement comprising:

first means responsive to engine operating conditions including engine crankshaft rotation effective to generate a first digital number for the sparking event of each cylinder representing the timing of said sparking event in relation to a reference crankshaft position, said timing being advanced from the times knock-free combustion is certain to occur under all variations of said engine operating conditions;

an accelerometer responsive to background accelerations due to engine operation and to individual engine ringing vibrations produced by knocking combustion;

a sampler responsive to the accelerometer signal during regularly short sample period at a time in the combustion cycle immediately prior to knock-induced ringing vibrations;

second means effective to count the number of said vibrations during a predetermined counting time a predetermined amount in excess of a reference level determined from the sampler signal, said means including a further counter effective to generate a second digital number by successively increasing the count on said last counter by a predetermined number when the number of such vibrations during said counting time exceeds a predetermined count number and decreasing the count of said last counter by a predetermined number when the number of such vibrations during said counting time does not exceed said predetermined count number;

means to generate a spark-creating voltage and apply the same to the engine cylinders in sequene; and means responsive to engine crankshaft rotation and said first and second digital numbers to combine said first and second digital numbers arithmetically and actuate said last means, with respect to said reference crankshaft rotation in the sense of increased delay with increased numbers of ringing vibrations counted by said second means, in accordance with the arithmetic combination of said first and second digital numbers;

whereby the engine operates at its most effective spark timing value as determined by said first means while being limited to the spark timing as limited by knocking effects as determined by said second means.

6. The method of operating a spark ignition internal combustion engine in automobile usage, said engine having a plurality of cylinders within each of which a piston reciprocates in accordance with crankshaft rotation and an intake manifold through which gas is admitted to the respective cylinders for combustion in power strokes at successive uniformly spaced crank angles, comprising the steps of:

sensing acceleration of the manifold with rapidity of response sufficient to sense individual ringing vibrations associated with knock;

generating in a knock-free period immediately following the successive spark events in the respective cylinders a reference signal determined by the average acceleration of the manifold due to vibrations during such period;

counting, in each period when knock vibrations occur, if there is knocking, the number of times the sensed acceleration due to such vibrations exceeds a value determined by the reference signal;

retarding the engine spark event to all cylinders in unison by a predetermined fixed amount of crankshaft rotation when such count exceeds a first predetermined number during a predetermined crankshaft rotation at least substantially equal to the rotation between successive power strokes of the engine and advancing the engine spark event to all cylinders in unison by a like amount when the count is less than a second predetermined number no greater than said first predetermined number during such crankshaft rotation.

7. The method of operating a spark ignition internal combustion engine in automobile usage, the engine having a plurality of pistons which normally execute power strokes at successive uniformly spaced crank angles, comprising the steps of:

generating a spark timing voltage from the crankshaft position at times advanced from the times spark events should normally occur;

generating a first digital number determined by engine operating conditions and indicative of the retard of said spark timing voltage in terms of crankshaft rotation required for predetermined engine operation irrespective of knocking or detonation;

sensing the presence or absence of individual knock-induced ringing vibrations exceeding a predetermined magnitude during the successive power strokes of the engine;

counting the number of such individual vibrations during a predetermined amount of crankshaft rotation at least substantially equal to the crankshaft rotation between successive power strokes;

generating a second digital number of increasing the count on a counter by a predetermined number when the number last counted is greater than a first predetermined value and decreasing the count on the counter by a predetermined number when the number last counted is greater than a second predetermined value no greater than said first predetermined value; and generating spark voltages for the engine in accordance with said first spark timing voltage, but delayed by an increment of crankshaft rotation units equal the difference of said first and second counting numbers.

8. A spark timing system for an internal combustion engine having a crankshaft and a plurality of spark plugs to which ignition voltage pulses are successively applied as the crankshaft rotates, comprising in combination:

first means responsive to individual knock-induced ringing vibrations of the engine in excess of a predetermined threshold level so as to provide a digital pulse signal not timed in relation to crankshaft rotation;

a first counter effective to count the number of pulses in said signal occurring during successive predetermined first angles of crankshaft rotation;

a second counter effective to increase its count when the count of the first counter is greater than a first predetermined number during any of a second predetermined number of successive predetermined first angles of crankshaft rotation and effective to decrease its count when the count of the first counter is less than a third predetermined number at most equal to said first predetermined number during all of said second predetermined number of predetermined first angles of crankshaft rotation;

second means to generate a spark timing pulse for each spark ignition event, each said pulse having a predetermined timing determined by mechanism not directly responsive to engine knock; and third means to generate an ignition pulse for each spark timing pulse and effective to retard each ignition pulse from each spark timing pulse by a second angle of crankshaft rotation proportional to the count of the second counter.

9. A spark timing system for an internal combustion engine having a crankshaft and a plurality of spark plugs to which ignition voltage pulses are successively applied as the crankshaft rotates, comprising in combination:

first means responsive to individual knock-induced ringing vibrations of the engine in excess of a predetermined threshold level so as to provide a digital pulse signal not timed in relation to crankshaft rotation;

a first counter effective to count the number of pulses in said signal occurring during a predetermined first angle of crankshaft rotation;

a second counter effective to decrease its count when the first count is less than a first predetermined number during said first angle of crankshaft rotation and to increase its count when the first count is greater than a second predetermined number at least equal to said first predetermined number during said first angle of crankshaft rotation;

second means to generate a spark timing pulse for each spark ignition event, each said spark timing pulse having a predetermined timing determined by mechanism not directly responsive to engine knock; and third means to generate an ignition voltage pulse for each spark timing pulse and effective to retard each ignition pulse from each spark timing pulse by a second angle of crankshaft rotation proportional to the count of said second counter.

10. A spark timing system for a multi-cylinder internal combustion engine having a crankshaft and a plurality of spark plugs to which ignition voltage pulses are successively applied as the crankshaft rotates, the rotation between successive ignition voltage pulses defining predetermined first angles, the engine completing an operating cycle upon each successive firing of one of said spark plugs, said system comprising in combination:

first means responsive to individual knock-induced ringing vibrations of the engine in excess of a predetermined threshold level so as to provide a digital pulse signal not timed in relation to crankshaft rotation;

a first counter responsive to said pulse signal and crankshaft rotation and effective to count the pulses in said pulse signal during each said predetermined first angle;

a second counter effective at substantially the beginning of each operating cycle to increase its count when said first counter has had at least a first predetermined number at the conclusion of any of the predetermined first angles in the immediately previous operating cycle and to decrease its count when said first counter has had less than a second predetermined number at most equal to said first predetermined number at the conclusion of all of the predetermined first angles in the immediately previous operating cycle;

second means to generate a spark timing pulse for each spark ignition event, each said pulse having a predetermined timing determined by mechanism not directly responsive to engine knock; and third means to generate an ignition voltage pulse for each spark timing pulse and effective to retard each ignition voltage pulse from each spark timing pulse by a second angle of crankshaft rotation proportional to the count of said second counter, whereby the amount of retard, if any, of the ignition voltage pulses from the spark timing pulses is controlled by the cylinder having the greatest number of knock-induced ringing vibrations.

11. A spark ignition internal combustion engine suitable for vehicle use comprising an intake manifold of the type exhibiting ringing vibrations in response to engine knock and background vibration not related to engine knock, a crankshaft, and a plurality of cylinders with spark plugs to which ignition voltage pulses are successively applied as the crankshaft rotates to initiate combustion events in the cylinders, and further comprising:

an accelerometer mounted on the intake manifold and responsive to individual knock-induced ringing vibrations and the background vibrations;

a comparator responsive to the accelerometer and having a predetermined threshold level determined by said background vibrations so as to provide an output digital pulse signal for each individual ringing vibration in excess of the predetermined level;

a first counter effective to count the number of pulses in said signal occurring during successive predetermined first angles of crankshaft rotation;

a second counter effective to increase its count when the count of the first counter exceeds a first predetermined number during any of a second predetermined number of one or more such successive predetermined first angles of crankshaft rotation and effective to decrease its count when the count of the first counter is less than a third predetermined number at most equal to said first predetermined number during all of said second predetermined number of successive predetermined first angles of crankshaft rotation;

first means effective to generate a basic spark timing pulse for each spark ignition event, each said pulse having a predetermined timing determined by mechanism not directly responsive to engine knock; and second means effective to generate an ignition pulse for each spark timing pulse and further effective to retard each ignition pulse from each spark timing pulse by a second angle of crankshaft rotation proportional to the count of the second counter, whereby engine knock, as measured by numbers of knock-induced ringing vibrations of said intake manifold in predetermined reference angles of crankshaft rotation, is limited to a predetermined maximum acceptable level.

* * * * *